March 12, 1957     H. LEFKE     2,784,937
TIRE SPREADER
Filed June 15, 1954
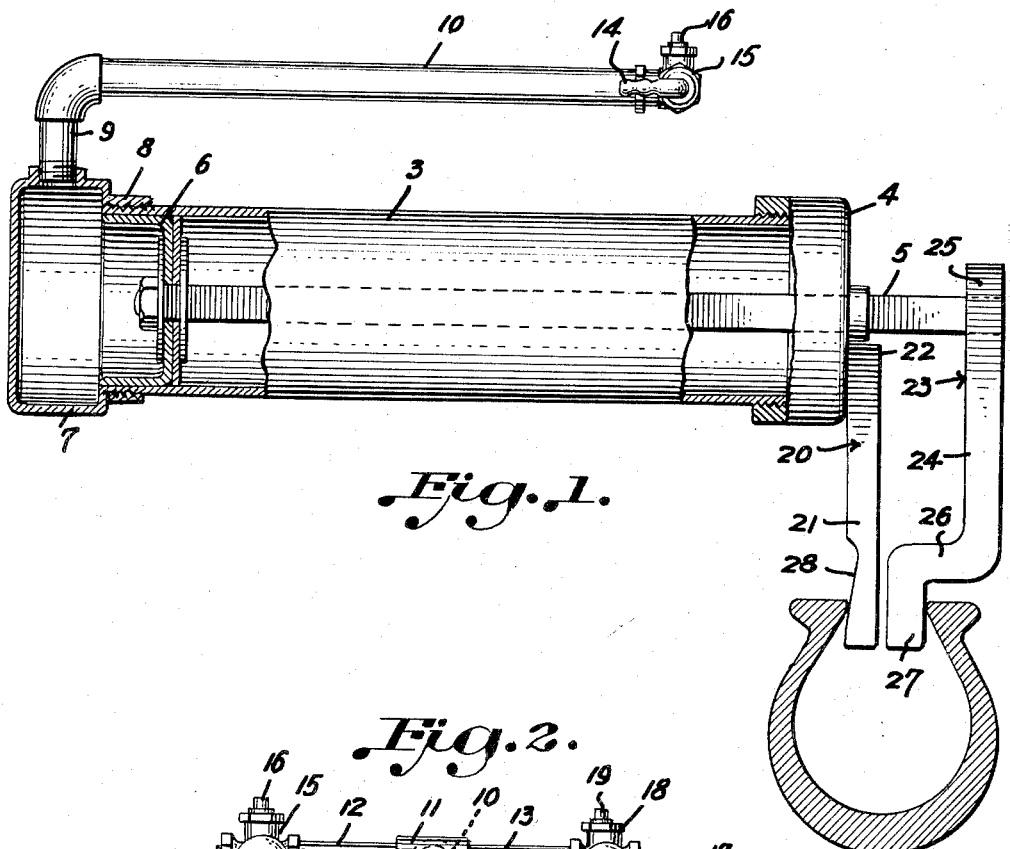
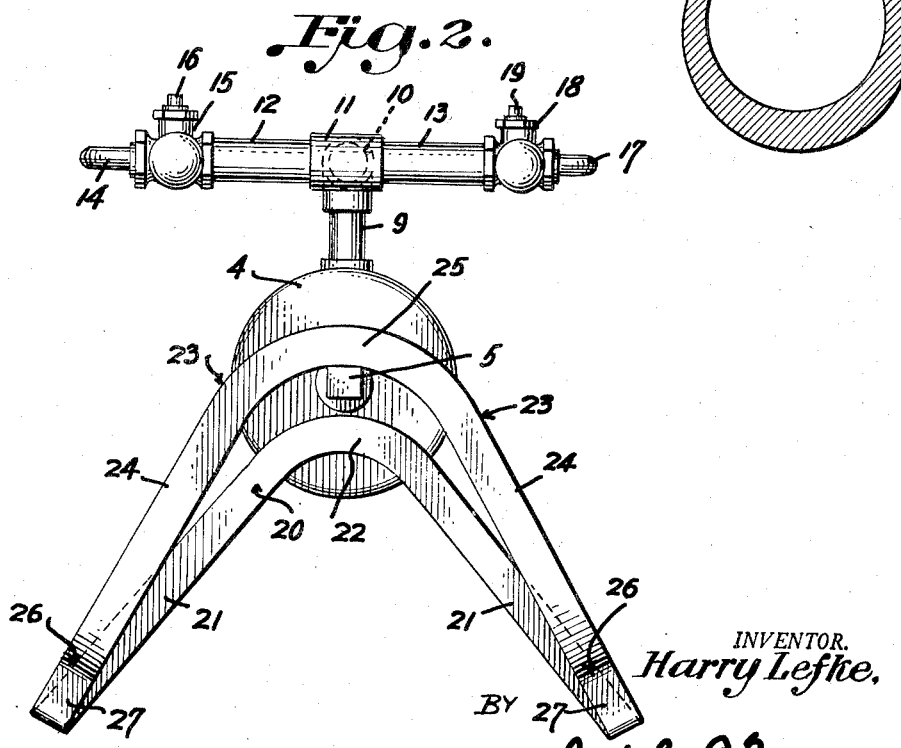
INVENTOR.
Harry Lefke,
BY
ATTY.

United States Patent Office 2,784,937
Patented Mar. 12, 1957

2,784,937

TIRE SPREADER

Harry Lefke, Lansing, Mich.

Application June 15, 1954, Serial No. 436,887

2 Claims. (Cl. 254—50.3)

This invention is a tire spreader for use in spreading the tires or casings of automobile wheels for the purpose of the interior inspection thereof or to facilitate repair operation.

The primary object of the invention is to provide a tool of simple construction for quick and easy application of the same to a tire casing and involving means operated by air pressure for quickly and easily spreading the tire laterally and maintaining the same in such spread position for such time as may be determined by the operator.

A further object of the invention is to provide a tire spreading tool involving the use of compressed air for its operation, equipped with means whereby the tool may be quickly and easily attached to an air pressure hose, and involving means of simple and easily operated nature to admit the required pressure to the tool for the spreading operation, and which may be equally as easily operated to relieve the pressure in order that the tire maintain its normal position after inspection or repair have been completed.

A still further and particular object of the invention is to provide a tire spreading tool composed of but few simple, inexpensive and readily assembled parts, which has its parts so constructed and combined as to minimize the opportunity for wear, breakage or derangement, which is extremely simple in its operations both to expand as well as to contract the tire, which is of light weight so as to be readily transported and handled with a minimum of effort, which may be manufactured and marketed at low price and which will prove highly effective in carrying out its objects.

With the foregoing objects in view, together with others which will appear as the description proceeds, the invention resides in the novel construction, combination and arrangement of parts, all as will be described more fully hereinafter, illustrated in the drawing, and particularly pointed out in the claims.

In the drawings:

Fig. 1 is a side elevation, parts broken away, of a tire spreading tool constructed in accordance with the invention, the view illustrating the position the parts will assume when operatively associated with a conventional motor vehicle tire just prior to the spreading operation, and Fig. 2 is an end elevation of the improved tool.

Referring now more particularly to the drawing, 3 indicates a hollow cylinder or sleeve of comparatively small diameter, closed at one end by a cap or head 4 as by threads as shown. This cap is provided with a central aperture having angular walls, in the present case the aperture being square or substantially so to slidingly accommodate a piston rod 5 of similar shape and size in cross section. This rod has affixed to its inner end a piston indicated at 6 which snugly fits the inner walls of the cylinder or sleeve 3.

The opposite or rear end of the sleeve 3 is closed by a head 7, the said head being provided with an annular flange 8 provided with threads upon its interior wall to engage corresponding threads upon the exterior of the sleeve end 3. The head 7 has connected thereto one end of a pressure pipe 9 having a portion 10 disposed substantially parallel with the sleeve or cylinder 3. The forward end of the pipe 10 is provided with a union 11 to the opposite sides of which are connected branch pipes 12 and 13. The branch pipe 12 has its outer end provided with a fitting or nozzle 14 to be engaged with an air hose (not shown) extending from a source of air supply. The branch pipe 12 is also provided with a valve 15 having a plunger 16 which, when depressed, will open the valve but upon being released will normally seat in sealing or closed position.

The outer end of the opposite branch pipe 13 is provided with an exhaust or outlet nozzle 17 and also a valve 18 having a plunger 19; the valve being of such construction as to be normally closed but which may be opened to exhaust the pressure from within the branch pipe 13 when the plunger 19 is depressed, in all respects similar to the valve 15.

It will be observed that the pipe 10 is disposed relatively close to and parallel with the cylinder 3, and in addition to constituting a duct for compressed air, also serves as a handle by which the tool may be conveniently carried or manipulated.

The cap 4 is provided with a lateral diverging fixed arm 20, the said arm projecting a substantial distance beyond the cylinder. This arm comprises spaced diverging legs 21 connected by the bight portion 22 which portion is rigidly affixed to the cap 4. The projecting end of the piston rod 5 has rigidly secured thereto an operating arm 23, which arm also includes a pair of diverging legs 24 connected by the bight portion 25 which is rigidly secured to the extremity of piston rod 5. The arms 20–23 are so constructed and assembled that the ends of their legs lie closely adjacent to one another and in substantial alignment with one another longitudinally of the cylinder 3. The legs 24 of the arm 23 are extended inwardly near their outer ends to provide a substantially right angular portion 26, from the inner extremities of which extend the sub arms 27 disposed in substantial parallelism with the legs 23. The extremities of the legs 21 of the fixed arm 20 have their rear faces beveled or inclined inwardly from the extremities thereof, as at 28, to provide a bearing portion for the inner edge of the tire bead as shown in Fig. 1. The portions 26 of the legs 24 constitute stops or shoulders against which the inner edge of the tire bead may engage during the expanding operation to limit the distance of travel of the bead along the arms.

In operation, the nozzle or fitting 14 is connected to the end of an air hose leading from a suitable source of air under pressure. When it is desired to expand a tire or casing, either for purposes of inspection or repair, the legs of the arms 20–23 are applied to the tire casing transversely thereof in the manner illustrated in Fig. 1. With the lower extremities of these arms in the position shown, the valve plunger 16 is depressed to permit air under pressure to enter the pipe 10 and pass to the interior of the cylinder 3 through pipe 9 and behind the piston 6. This pressure forces the piston and its attached rod 5 in an outward direction, causing the arm 23 to move in an outward direction and away from the fixed arm 20. During this spreading operation, the beads of the tire will be held firmly between the outer faces of sub arms 27 and the inclined face 28 so as to be firmly held by the spreading arms and against slippage therefrom. When the tire has been expanded or opened the desire distance, the valve plunger 16 will be released, the trapped pressure within the cylinder thus holding the parts in the expanded position. When it is desired to remove the tool, it is but necessary to depress the plunger 19 of the outlet valve 18, whereupon the pressure within the cylinder 3 will pass out through the pipe 10 and the outlet 17.

The piston 5 being angular in cross section, substantially square in the present instance, cannot turn relative to its retaining cap or head 4, so that the spreader arms 20 and 23 are at all times maintained in proper relationship to one another.

The spreading tool here described is of extremely simple construction, being composed of standard parts which may be readily procured and assembled in the manner shown and described. The tool is compact and of light weight so as to be readily manipulated without the exercise of special skill and yet will prove highly efficient in accomplishing its purposes. The arrangement of the pipe 10 overlying the cylinder 3 and in substantial parallelism therewith not only lends to the compactness of the tool but provides a handle by which the tool may be readily manipulated or carried about.

I claim:

1. A portable tire spreading tool comprising an elongated hollow cylinder, a cap closing one end of said cylinder, a piston rod slidable in said cylinder and projecting at one end through said cap, an arm connected to said rod end, a second arm secured to said cap, a piston within said cylinder secured to the opposite end of said rod, a head closing the opposite end of said cylinder, a pressure pipe secured at one end to said head and in communication with the interior of said cylinder and disposed at right angles to the axis of the latter, said pipe having a right angularly disposed extension spaced from and in parallelism with said cylinder and overlying the latter to provide a handle and having its outer end terminating inwardly of said cap, branch pipes extending laterally from said outer pipe end and in communication with the latter, means at the end of one of said branch pipes to connect an air hose therewith, a pressure supply valve in the last named branch pipe, a normally closed pressure relief valve in the other of said branch pipes, and operating plungers connected to each of said valves and projecting upwardly from said branch pipes.

2. A tire spreading tool as defined in claim 1 wherein the valves are arranged relatively close together and within reach of the thumb of the hand of an operator holding said pressure pipe.

References Cited in the file of this patent

UNITED STATES PATENTS

| | | |
|---|---|---|
| 1,481,053 | Evans | Jan. 15, 1924 |
| 2,073,510 | Bishman | Mar. 9, 1937 |
| 2,223,915 | Lambert | Dec. 3, 1940 |